Figure 4:
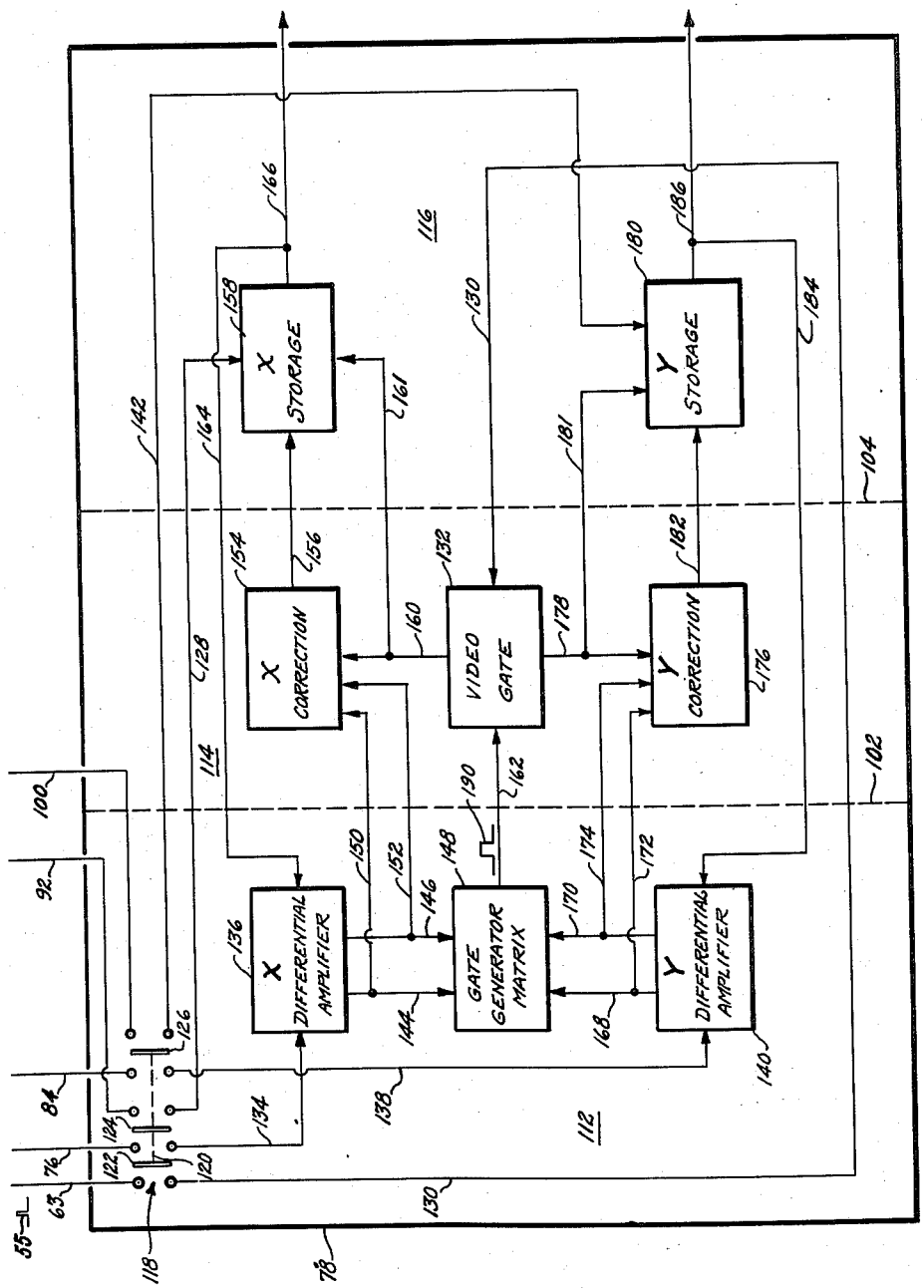

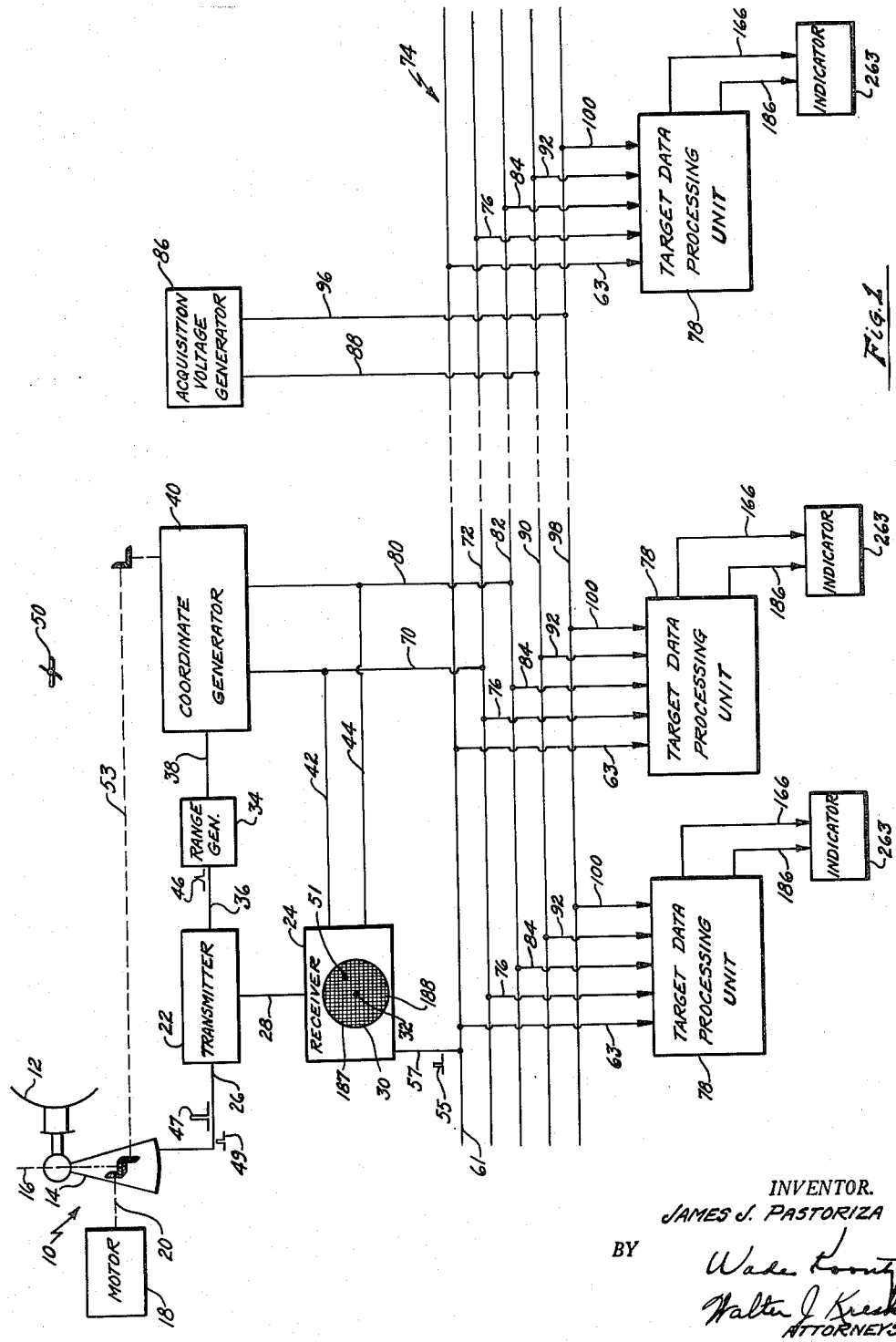

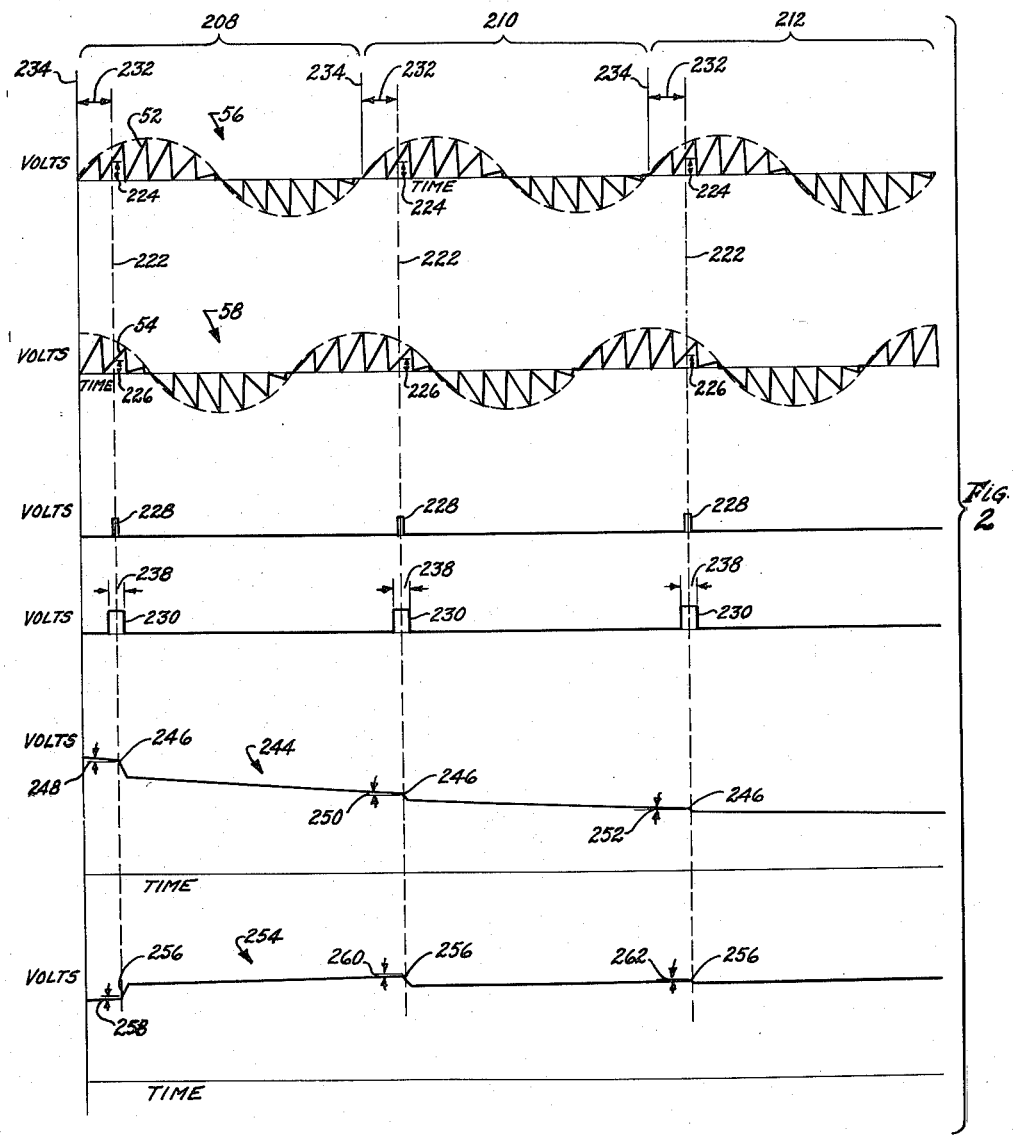
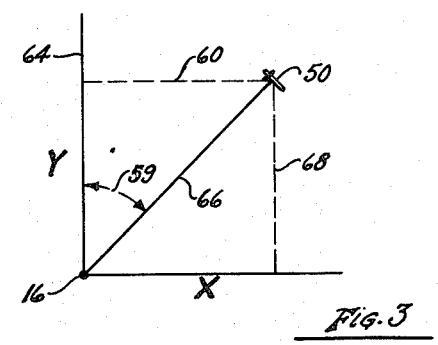
Fig. 3

INVENTOR.
JAMES J. PASTORIZA

INVENTOR.
JAMES J. PASTORIZA

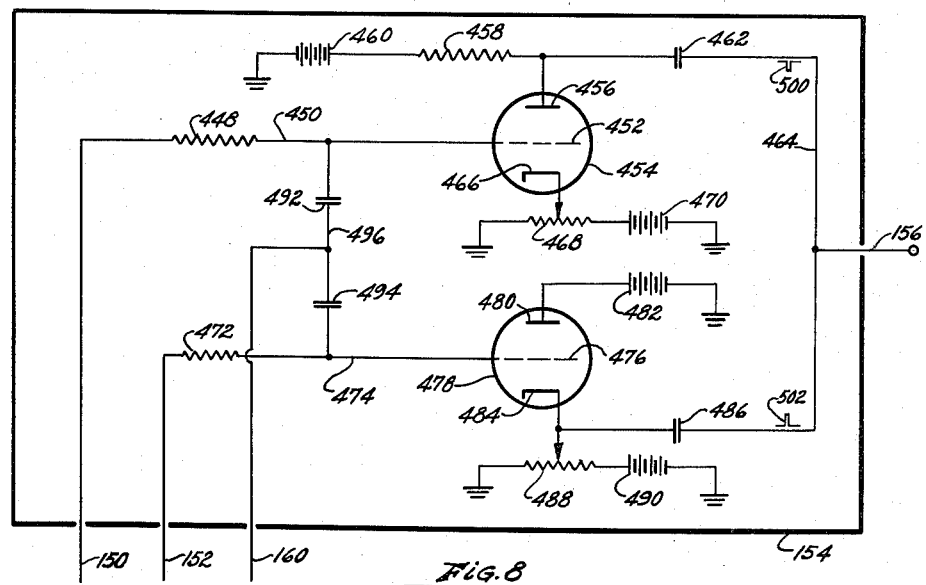

Jan. 2, 1962  J. J. PASTORIZA  3,015,817
AUTOMATIC TRACKING APPARATUS
Filed May 25, 1956  8 Sheets-Sheet 8

INVENTOR.
JAMES J. PASTORIZA
BY Wade Koontz
Walter J. Kreske
ATTORNEYS

United States Patent Office 3,015,817
Patented Jan. 2, 1962

3,015,817
AUTOMATIC TRACKING APPARATUS
James J. Pastoriza, 46 Lincoln St., Belmont, Mass.
Filed May 25, 1956, Ser. No. 587,439
5 Claims. (Cl. 343—7.3)
(Granted under Title 35, U.S. Code (1952) sec. 266)

The invention described herein may be manufactured and used by or for the United States Government for governmental purposes without payment to me of any royalty thereon.

This invention relates to radar tracking systems for automatically tracking a moving target and producing continuous output voltages corresponding to the coordinates of the target.

In the application of radar systems to a number of targets simultaneously, such as aircraft in traffic control or air defense, many problems arise. The observations of a pictorial display on the radar screen does not usually present a satisfactory method for making decisions involving the numerous targets involved. The visual interpretations from the radar screen cannot usually be made with the necessary accuracy and speed required in such situations. Methods of utilizing the radar data, other than by human observation and interpretation of pictures and symbols for obtaining the required speed and accuracy in handling and analyzing a number of airborne targets simultaneously are necessary. The data from the selected targets must be in continuous and in readily utilizable form.

Pursuant to the present invention a tracking system has been devised wherein the data on selected targets of a single scanning radar may be isolated and maintained simultaneously in separate channels, each assigned to one of the selected targets. Each of the channels in the system automatically tracks the selected target during the scan of the radar. It succeeds in converting the inherently noisy and discontinuous output of the scanning radar into noise-free, continuous, consistent data. Also, this target information data is in the desirable form of Cartesian coordinates, even though the scanning radar data is in polar coordinate form.

Accordingly, an important object of the present invention is to provide an automatic radar tracking system which produces target position and velocity data in Cartesian coordinate form.

Another object is to provide a radar tracking system capable of the simultaneous tracking of a number of targets from a single scanning radar.

A further object is the provision of a radar tracking system having a separate channel for tracking each of the selected targets, each channel effectively isolating and utilizing the scanning radar data of the assigned target.

Another object is the provision of a radar tracking system having a continuous noise-free data output on the position and velocity of a selected target.

And another object is the provision of a radar tracking system having a continually maintained pair of voltage outputs, proportional to the X and Y coordinate positions of a selected target with respect to the scanning radar.

And another object is the provision of a radar tracking system capable of maintaining continuous output data even over extended periods of radar fading.

Another object is the provision of a tracking radar which is rugged, relatively simple in construction and capable of operation by a single individual even where the servicing of numerous targets is involved.

Figure 5:
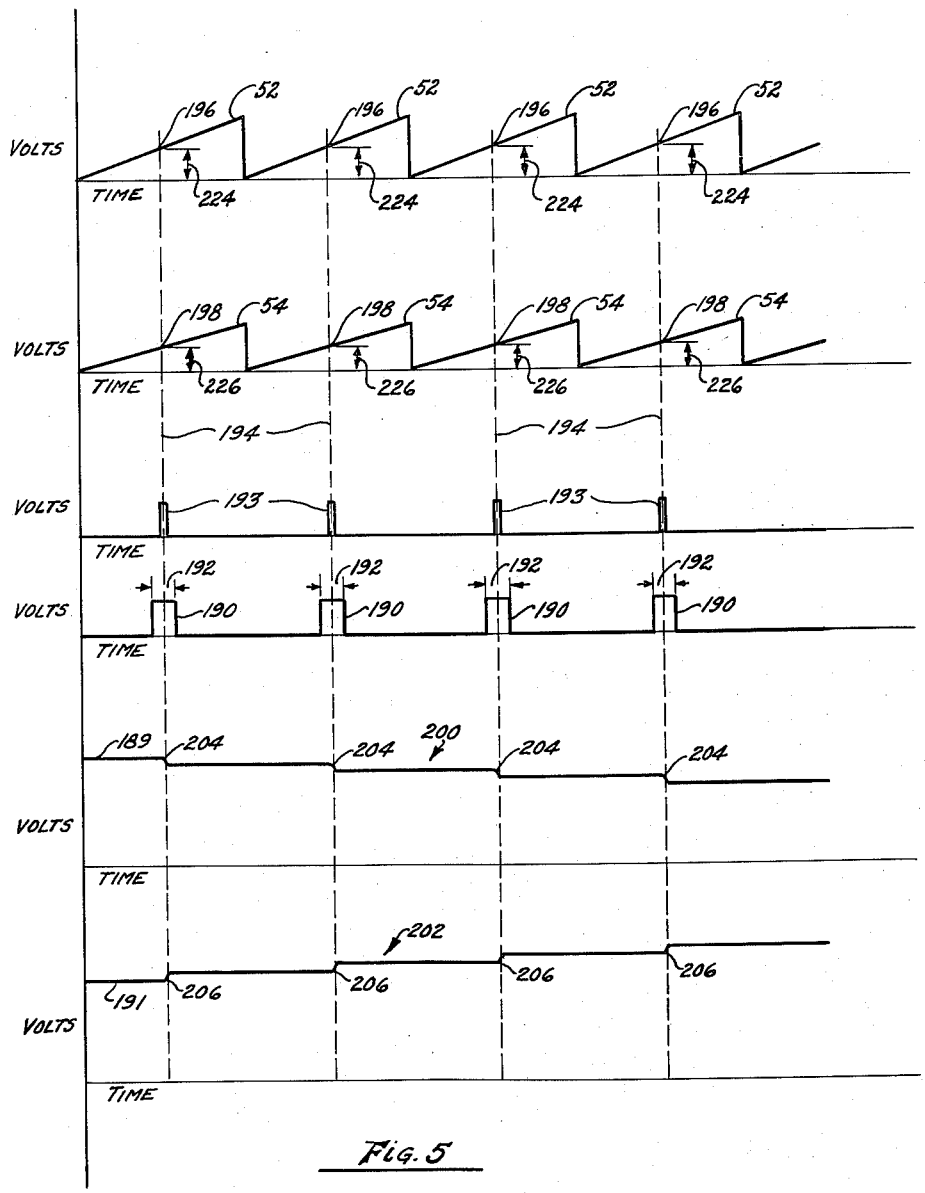
Figure 6:
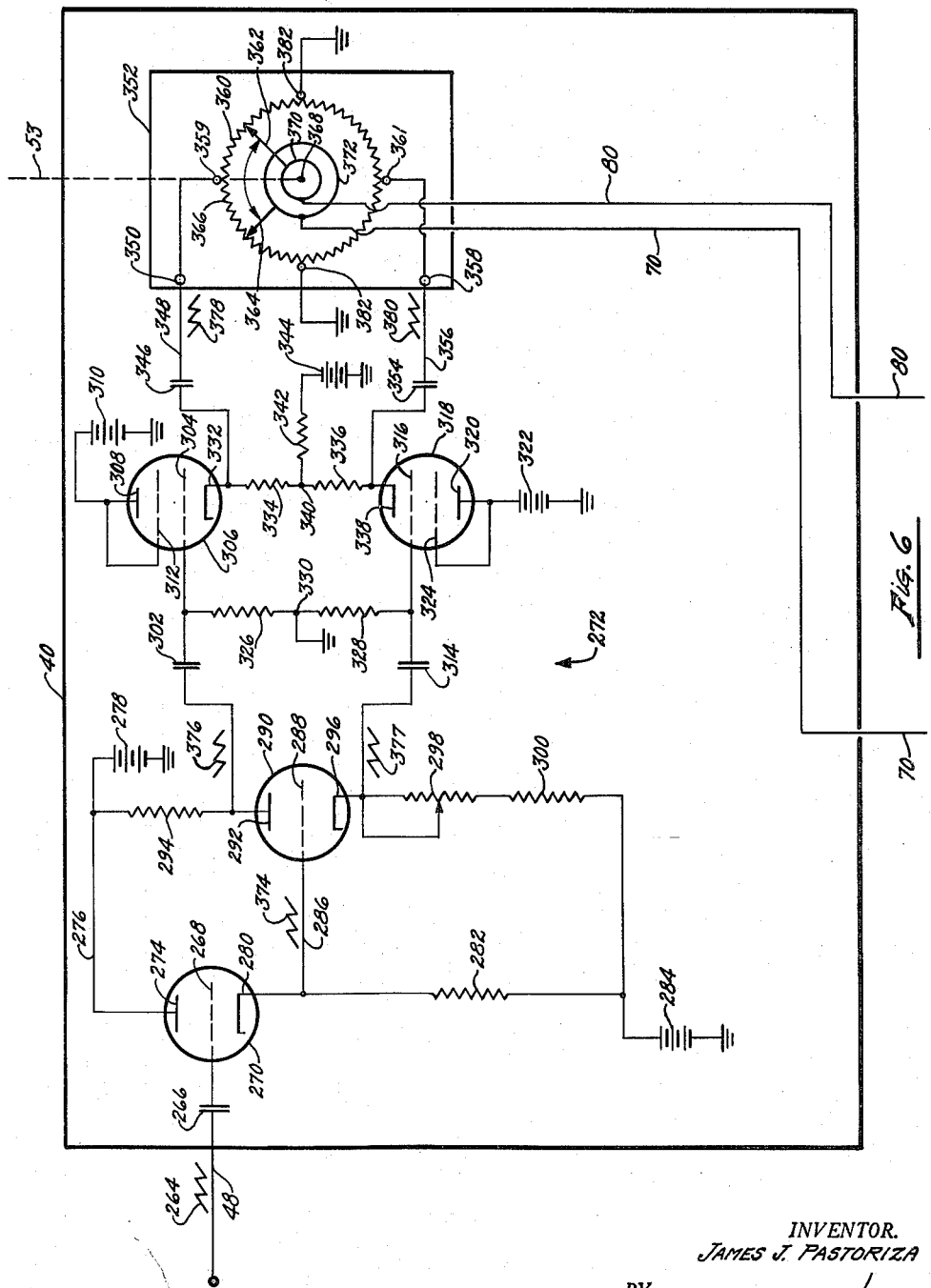
Figure 7:
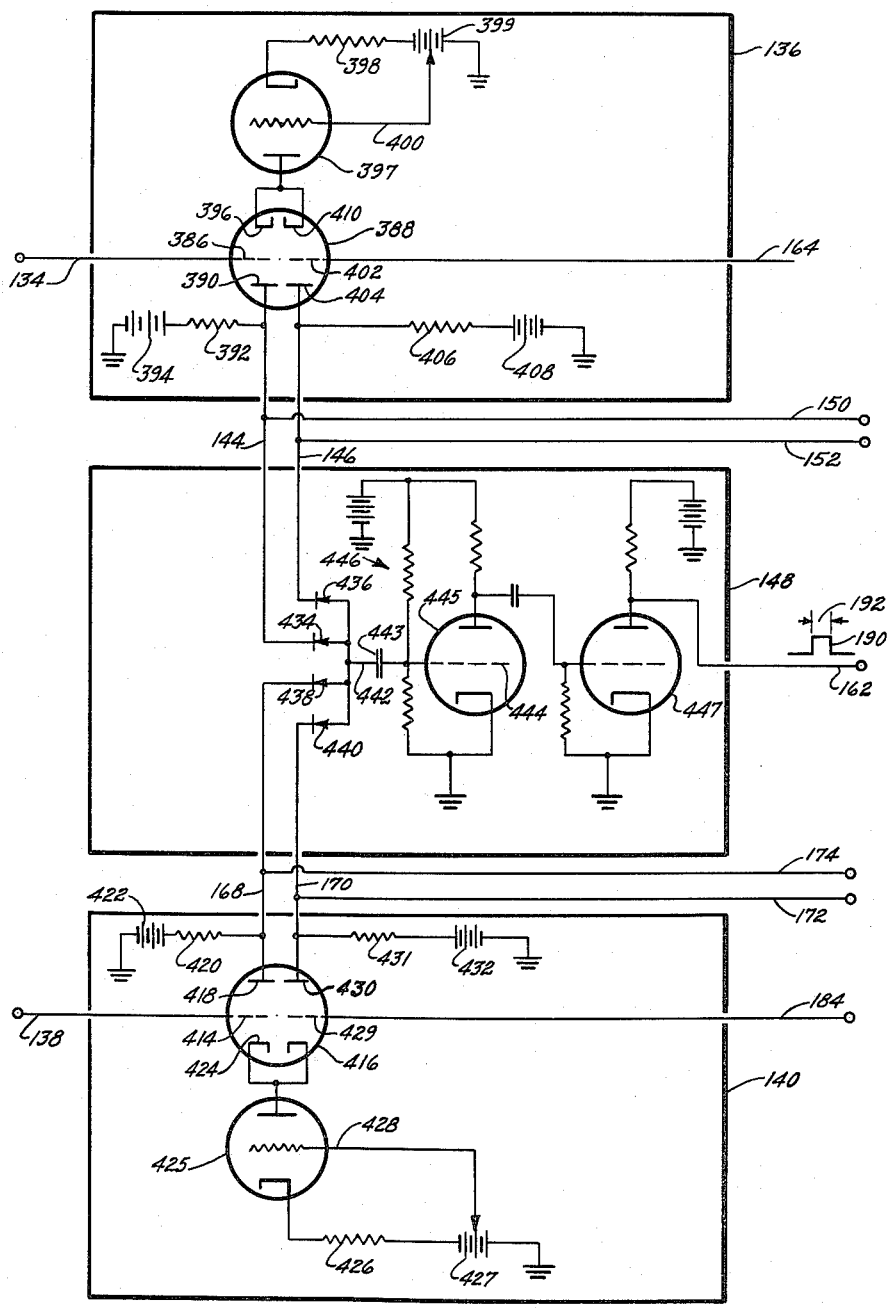
Figure 10:
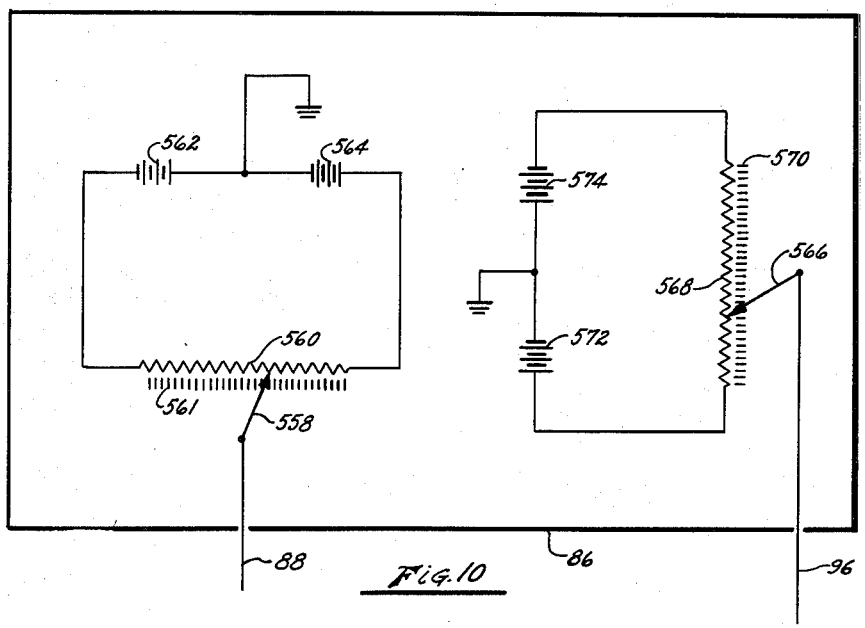
Figure 11:
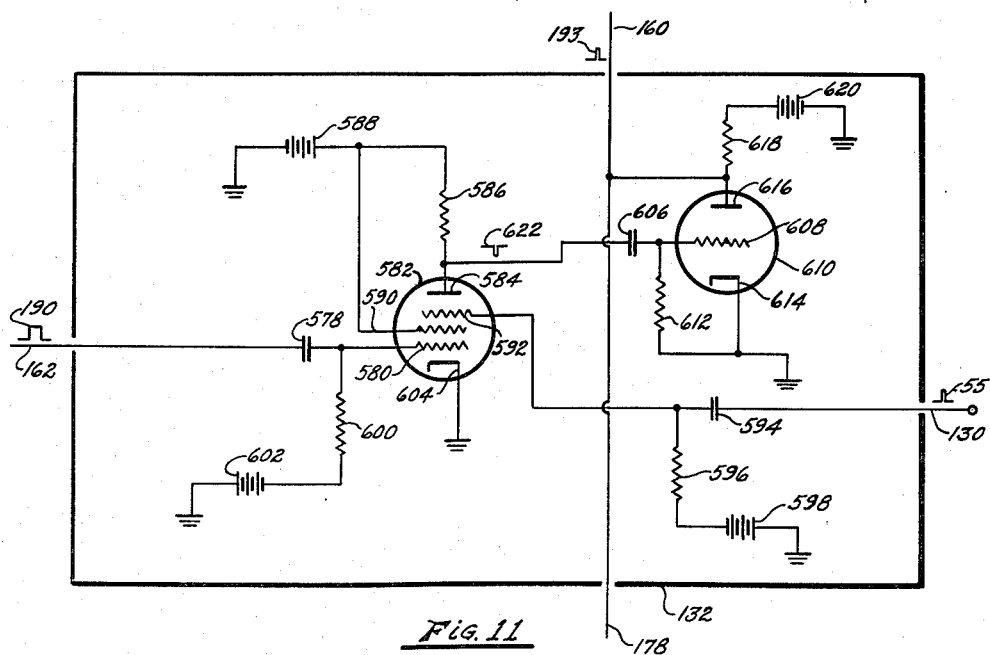

These and other features, objects, and advantages will become more apparent from the following description taken in connection with the accompanying drawings of a preferred embodiment of the invention and wherein:

FIG. 1 is a block diagram of a preferred embodiment of the invention;
FIG. 2 is a diagram illustrating voltage signals generated in the various components of the present embodiment to more clearly illustrate operation;
FIG. 3 is a diagram illustrating X and Y coordinates of a target and orientation of the radar antenna in the present embodiment;
FIG. 4 is a block diagram illustrating the construction of a data processing unit in the present embodiment;
FIG. 5 is a diagram illustrating voltage signals used in target tracking in the present embodiment;
FIG. 6 is a schematic diagram of a circuit suitable for use as a coordinate generator in the present embodiment;
FIG. 7 is a schematic diagram of circuits suitable for use as the X and Y differential amplifiers and the gate generating matrix in the present embodiment;
FIG. 8 is a schematic view of a correction circuit suitable for use in the present embodiment;
FIG. 9 is a schematic illustration of a suitable circuit for storing the position voltage in the present embodiment;
FIG. 10 is a schematic diagram of an acquisition voltage generator suitable for use in the present embodiment;
FIG. 11 is a schematic diagram of a video gate circuit suitable for use in the present embodiment.

Referring to FIG. 1 in more detail, a scanning radar unit is shown, generally, by the numeral 10. The radar unit 10 is of conventional construction and has a scanning antenna 12 mounted to rotate on a support 14 about an axis 16. Power for rotating the antenna 12 is supplied by a motor 18 through a linkage 20.

The radar unit 10 also has a transmitter 22 and a receiver 24. The transmitter 22 is in operative engagement with the antenna 12 through a high frequency pulse energy conductor 26. The receiver is connected in conventional manner by a line 28. The transmitter 22 may be of conventional design for transmitting pulses of high frequency radio energy. The receiver 24 may also be of conventional design for receiving reflected or echo radio energy pulses of corresponding transmitted pulses, from targets in the paths of the transmitted pulses. These echo pulses are made to appear on an indicator 30 which may be a conventional plan position indicator in the receiver 24. The echo pulses are made to appear on the indicator 30 in conventional polar coordinate positions about an axis or center point 32. To effect this polar positioning the radar 10 includes a conventional sawtooth range voltage generator 34 connected by a line 36 to the transmitter 22 and by a line 38 to a coordinate generator 40. The coordinate generator 40 is connected through lines 42 and 44 to the receiver 24 to cause the polar coordinate operation of the indicator 30. The coordinate generator 40 and range generator 34 together generate in conventional manner a rotating field at the indicator 30 for causing the above-mentioned polar coordinate operation.

Operation of the sawtooth range generator 34 is synchronized with the transmitter 22 by a triggering signal, such as a master pulse 46 used in the transmitter 22 to initiate each radio frequency burst or signal 47 in line 26 for transmission by the antenna 12. A corresponding reflected or echo 49 from the target 50, such as an airplane in the path of the transmitted signal 47, will thereby be picked up at the antenna 12, and appear through line 28 at the receiver 24. After suitable amplifying and rectification the echo pulse will appear as a blip or luminous spot 51 on the indicator 30 in a position corresponding to the position of the target 50 with respect to the antenna 12. The spacing between the blip 51 and center point 30 is proportional to the distance of the target 50 from the antenna 12 and is caused by the range generator 34. The orientation or azimuth position of the blip 51 with respect to the center point 32 is effected by a synchronizing linkage 53 between the antenna 12 and the coordinate generator 34, as will be hereinafter more fully described. The radar echo signal 49, after being rectified and amplified in the receiver 24, is also made to appear as a pulse 55 through a line 57 to line 61 of a data feed network 74 (FIG. 1) and thereby through a line 63 at each of a series of target data processing units 78, each for tracking a separate target as the target 50, as will be hereinafter more fully described with regard to FIG. 4. The data processing units 78 will herein be referred to, also, as units to distinguish them from other system components.

In the coordinate generator 40, the output of the sawtooth range voltage generator 34 in line 38 is converted into two sawtooth voltage signals 52 and 54 shown in the voltage time graphs 56 and 58, respectively, in FIG. 2. The sawtooth voltage waves, as 52 in the graph 56, are the range sawtooth voltage signal outputs of the range generator 34, which, in addition to being synchronized with each trigger pulse 46, are also modulated by the sine of the angle 59 (FIG. 3) to thereby represent the X coordinate 60 of the orientation of the antenna 12 at a given instant of time. For convenience herein, the line 64 may represent a northerly azimuth directional orientation of the antenna 12 as a starting reference. The line 66 represents the directional orientation of the antenna 12 as it rotates about the scanning axis 16.

In comparable manner the sawtooth voltage waves 54 are modulated by the cosine of the orientation angle 59 to thereby represent the Y coordinate 68 of the antenna 12 orientation corresponding to the X coordinate 60. This sine and cosine synchronization with the antenna 12 is effected, as mentioned above, by the mechanical drive linkage 53 in driven engagement with the antenna drive linkage 20. It should be understood here that the frequency of the sawtooth voltage waves 52 and 54 is much greater than that shown in FIG. 2 where the representation is for simplicity of illustration only.

The X coordinate sawtooth voltage wave forms 52, in addition to appearing in line 42, are made to appear through a line 70 to line 72 of the data feed network 74, and thereby through a line 76 at each of the data processing units 78.

The Y coordinate sawtooth voltage wave forms 54, in addition to appearing in line 44, are made to appear through a line 80 to line 82 of the data feed network 74 and thereby through a line 84 to each of the units 78.

A further component in the present embodiment is a target acquisition voltage generator 86. The voltage generator 86 which will be more fully described in connection with FIG. 10 may be made to generate an X coordinate target acquisition voltage through a line 88 to line 90 of the data feed network 74 and thereby through lines 92 to each of the units 78. The X coordinate acquisition voltage in line 92 is a voltage proportional to the X coordinate 60 (FIG. 3) of a selected target 50 and is used in place of the X coordinate wave form 52 (FIG. 2) during acquisition of a target, as will hereinafter be more fully described.

The acquisition voltage generator 86 may also be made to generate a Y coordinate acquisition voltage through a line 96 (FIG. 1) to line 98 of the data feed network 74, and thereby through lines 100 to each of the units 78. The Y coordinate acquisition voltage in line 100 is proportional to the Y coordinate 68 (FIG. 3) of a selected target 50 and is used in place of the Y coordinate wave form 54 during acquisition of a target as will hereinafter be more fully described.

Referring to FIG. 4, in more detail, each of the units 78 has as its function the selection of the data of a single moving target as fed to it through lines 63, 76, 84, 92, and 100, the continuous processing of this data and the production of X and Y analogue voltages proportional to the Cartesian coordinates of the instantaneous position of a moving target.

To perform these selection and processing functions, each of the units 78 may be divided structurally by broken lines 102 and 104 into three basic functional sections; namely a comparison and gate generating section 112, a position correction section 114, and a position information storage section 116.

There are two modes of operation in each unit 78. The first involves the acquisition of the selected target and the second involves the tracking of the target after its acquisition. Each mode of operation is performed with a different set of data from the data feed network 74. In the acquisition of a target the information from the acquisition voltage generator 86 is used to the exclusion of all other information data fed to the unit 78. In the tracking of a target, the information from the coordinate generator 40 and echo pulses, such as 55 in line 57, are used to the exclusion of the data for acquisition. This switching from one set of data to another to change from target acquisition to tracking may be performed by a suitable mechanical switch, such as the switch 118.

In the switch 118 a mechanical linkage 120 activates in unison the switch arms or breakers 122, 124, and 126. Switch arm 122 may make and break circuit between a line 130 leading to a video gate circuit 132 and line 63 which receives echo pulses 55 from the receiver 24. Switch arm 124 may selectively make circuit between a line 134 leading to an X coordinate differential amplifier circuit 136 and line 76, or between line 92 and a line 128 leading to an X coordinate storage circuit 158. This arrangement permits the selective feeding of the X coordinate data for the tracking and acquisition modes of operation in the cartrac unit 78, as will be hereinafter more fully explained.

The switch arm 126 may selectively make circuit between a line 138 leading to a Y coordinate differential and amplifier circuit 140 and the line 84, or the line 100 and a line 142 leading to a Y coordinate storage circuit 180. This arrangement permits the selective feeding of the Y coordinate data for the tracking and acquisition modes of operation in the unit 78, as will be hereinafter further described.

The X differential amplifier 136 is connected by lines 144 and 146 to a gate generating matrix 148. Lines 144 and 146 are also connected through lines 150 and 152, respectively, to an X coordinate correction circuit 154. The X correction circuit 154 is connected through a line 156 to the X coordinate information storage circuit 158. The video gate circuit 132 is also connected to the X correction circuit 154 and the X storage circuit 158 through lines 160 and 161, respectively. The gate generating matrix 148 is also connected to the video gate 132 through line 162. A feedback line 164 is connected from an X coordinate output line 166 of the X storage circuit 158 to the X differential amplifier 136.

In similar manner the Y coordinate differential amplifier circuit 140 is connected through line 168 and 170 to the gate generating matrix 148. Lines 168 and 170 are also connected through lines 172 and 174, respectively, to a video gate circuit 132. The Y coordinate correction circuit 176 is connected by a line 178 to the video gate circuit 132 which is also connected by a line 182 to a Y coordinate storage circuit 180. The Y storage circuit 180 is also connected by a line 181 to line 178. A feedback line 184 is connected from a Y coordinate output line 186 of the Y storage circuit 180 to the Y differential amplifier 140.

The general block diagrammatic representation in FIGS. 1 and 4 are used here for simplicity of operating description, which follows. More detailed structure, where appropriate, will be presented herein after the description of operation.

*Target acquisition*

In operation, a selected target such as an airplane 50 will appear during normal scanning of the radar antenna 12 as a luminescent point or blip 51 on the indicator 30 in the radar unit 10. To track this selected target in one of the units 78, it is first necessary to place voltages in the X and Y storage circuits 158 and 180, respectively, which correspond to the respective Cartesian coordinates of the target. Such acquisition coordinate voltages are necessary for the proper gating and data selection, as will be hereinafter described.

Since the position of the blip 51 on the indicator 30, as explained above, is in the same relative position with respect to the center point 32, a grating of carefully spaced parallel lines 187 (FIG. 1) disposed horizontally and vertically disposed parallel lines 188 may be used to visually obtain the initial X and Y coordinates of the selected target 50. This information may then be manually fed to the acquisition voltage generator 86, as will be described in connection with FIG. 10 hereinbelow. Thereby X and Y coordinate voltages proportional to the position of the selected target 50 will appear in lines 88 and 96, respectively.

At the same time, the linkage 120 (FIG. 4) is activated to throw the switch arms 122, 124 and 126 to the right, to selectively make circuit between lines 128 and 92 and the lines 142 and 100. Thus, an X coordinate voltage wave 189 (FIG. 5) will appear through lines 88, 90, 92 and 128 at the X storage circuit 158. Thereby, this same X coordinate voltage will appear in the X coordinate output line 166 and through the feedback line 164 at the X differential amplifier 136.

Similarly, an initial Y coordinate voltage wave 191 (FIG. 5) will appear through lines 96, 98, 100 and 142 at the Y storage circuit 180. Thus, this initial Y coordinate position voltage 191 will be stored in the Y storage circuit 180 and will appear in the Y coordinate output line 186 and through the feedback line 184 at the Y differential amplifier 140.

This completes the acquisition mode of operation and places the unit 78 in condition for the automatic tracking mode of operation to be hereinafter described. It will be noted that this acquisition operation is very quickly performed. Only one of the units 78 will normally be assigned in this manner to the same target. Each of the units 78 is normally assigned to a different target. This acquisition operation must, therefore, be performed for each of the units 78 individually for each selected target. However, because of the rapidity of this operation a single individual may service numerous units 78 and thereby numerous targets in the area of the radar 10.

*Tracking*

In switching to the tracking mode of operation, the switch linkage 120 (FIG. 4) is moved to the left to move switch arms 122, 124 and 126 to the left.

Switch arm 122 will make circuit between lines 63 and 130 (FIG. 4). Echo or video pulses 55 from the receiver 24 will appear through lines 57, 61, 63, switch arm 122, and line 130 at the vide ogate circuit 132 (FIGS. 1 and 4).

Switch arm 124 will open the circuit between lines 92 and 128 and make a closed circuit between lines 76 and 134. Thus, the sine modulated X coordinate sawtooth voltage waves 52 (FIG. 2) will appear from the coordinate generator 50 through lines 70, 72, 76, switch arm 124 and line 134 at the X differential amplifier 136 (FIGS. 1, 2 and 4).

Switch arm 126 will open the circuit between lines 100 and 142 and make a closed circuit between lines 84 and 138 (FIG. 4). Thus, the cosine modulated Y coordinate sawtooth voltage waves 54 (FIG. 2) will appear from the coordinate generator 50 through lines 80, 82, 84, switch arm 126 and line 138 at the Y differential amplifier 140 (FIGS. 1, 2 and 4).

The X coordinate sawtooth voltage wave 52 and Y coordinate sawtooth voltage wave 54 will always have instantaneous values proportional to the X and Y coordinates of particular positions on the indicator 30 for reasons explained above with respect to FIG. 3. For clarity of illustration, four X and Y coordinate sawtooth voltage waves 52 and 54, respectively, are shown in FIG. 5 to a much increased time scale. The time involved for the four sawtooth voltage waves 52 and 54, shown in FIG. 5, is so short that the change in amplitude of each caused by the sine and cosine modulation is very small.

The X and Y differential amplifiers 136 and 140 and the gate generator matrix 148, which will be hereinafter more fully described with an illustrative circuit in connection with FIG. 7, are so designed that a gating pulse 190 (FIGS. 4 and 5) will appear through line 162 at the video gate 132 at the approximate time of the video pulses 55 reflected from the selected target 50 also appearing at the video gate 132. This is accomplished by making two continuous comparisons. The first is the comparison in the X differential amplifier 136 of the X coordinate sawtooth voltage wave form 52 from line 134 with the X coordinate stored position voltage in the feedback line 164 from the X storage circuit 158. The other is the comparison in the Y differential amplifier of the Y coordinate sawtooth voltage wave form 54 from line 138 and the Y coordinate stored position voltage in the feedback line 184 from the Y storage circuit 180.

The gate generating matrix 148, which will hereinafter be further described with an illustrative circuit, in connection with FIG. 7, is so designed that when the voltages in the X coordinate information line 134 and in the X coordinate feedback line 164 from the X storage circuit 158 are approximately equal, and the voltages in the Y coordinate information line 138 and in the Y coordinate feedback line 184 from the Y storage circuit 180 are approximately equal, the gating pulse 190 will appear through line 162 at the video gate 132. During the gating pulse 190, video pulses 55 reflected from the target 50 and which pass through lines 63 and 130 to the video gate 132 will thereby appear through lines 160 and 178 from the video gate 132 at the X correction circuit 154 and the Y correction circuit 176, respectively. The pulses 55 representing the selected target 50 and which pass through the video gate 132 in this manner are represented by pulses 193 in FIG. 5.

Because of the width 192 (FIG. 5) of the gating pulse 190, variations in occurrence of the selected target pulses 193 and gating pulses 190 will nevertheless still permit passage of the selected target pulses 193 through the video gate 132. At the same time other echo pulses 55, not from the selected target 50, are effectively stopped at the video gate 132 because they do not occur at the time of the gating pulses 190. In FIG. 5, the broken lines 194 correlate the timing in the voltage-time graphs illustrating operation. For example, the intersections 196 of the broken lines 194 and the X sawtooth voltage wave forms 52 shows the X coordinate voltage for each corresponding video pulse 193 appearing at the X correction circuits 154. This voltage is proportional to the X coordinate position 60 (FIG. 3) of the selected target 50. It will be noted here that this same voltage at 196 appears through line 134 at the X differential amplifier circuit 136 for comparison with the X coordinate voltage stored in the X storage circuit 158 which is approximately of the same value and shown to a different scale as the voltage 189 (FIG. 5) obtained in target acquisition.

In similar manner, the intersection points 198 on the Y coordinate sawtooth voltage wave form 54 represents the Y coordinate voltage at which the corresponding video pulses 193 occur. Similarly, this voltage is proportional to the Y coordinate position 68 (FIG. 3) of the selected target 50 and is approximately the same value as the storage voltage obtained in acquisition and shown to a different scale as the voltage 191 in FIG. 5.

The storage voltages in the X and Y storage circuits 158 and 180, respectively, are represented in FIG. 5 by curves 200 and 202, respectively. As previously pointed out, in target acquisition the voltages in the X and Y storage circuits 158 and 180 are initially set at the approximate X and Y coordinate values 189 and 191 representing the position of the selected target at the outset of the tracking mode of operation. Each of the video pulses 193 appearing at the X and Y correction circuits 154 and 176 will effect an incremental change in the stored voltage in the respective X storage circuit 158 and Y storage circuit 180 in a direction approaching the value which would represent the true X and Y coordinates of the changing target position. The X coordinate incremental changes of voltage stored in the X storage circuit 158 and appearing in the feedback lines 164 and the X output line 166 commence with each video pulse 193 occuring at the intersection positions 204 (FIG. 5) of the broken reference lines 194 and the X storage voltage curve 200. Similarly, the Y coordinate incremental changes of voltage stored in the Y storage circuit 180 and appearing in the feedback line 184 and the Y output line 186 commence with each video pulse 193 occurring at the intersections 206, position of the broken reference lines 194 and the Y storage voltage curve 202.

FIG. 5 shows a group of four incremental corrective changes effected by the target pulses 193 on the X and Y coordinate stored voltage waves 200 and 202, one for each X and Y pair of the sawtooth voltage signals 52 and 54. Each of the incremental corrective changes at points 204 and 206 is to correct for any error in position comparison and acquisition explained above, as well as changes of position of the selected target 50.

FIG. 2 which is to a condensed time scale from FIG. 5, shows the corrections taking place over several scans 208, 210 and 212 of the antenna 12. In FIG. 2, as was previously pointed out, because of limited space, a much smaller number of X and Y coordinate sawtooth voltage waves 52 and 54 are shown than occur in actual practice. Thus, a single sawtooth wave 52 in FIG. 2 represents a series of saw tooth voltage waves, even many more than the four sawtooth voltage waves 52 shown in FIG. 5. Also, each video pulse 228 in FIG. 2 represents a series of target echo pulses 193 (FIG. 5), and each of the broken reference lines 222 in FIG. 2 represents a comparable series of reference lines 194 in FIG. 5.

It is apparent, therefore, that a series of echo pulses 193 representing the selected target 50 and shown in FIG. 2 as a pulse 228 will pass through the video gate 132 and lines 160 and 178 to the X and Y correction circuits 154 and 176. The series of gating pulses, as pulse 190, from the gate generating matrix 148 (FIG. 4) corresponding to the series of echo pulses 193 shown by pulse 228 are shown in FIG. 2 as the single pulse 230. Three such echo pulses 228 and gating pulses 230 are shown in FIG. 2. These gates 230, as explained above with regard to gating pulses 190, occur at only one orientation of the antenna 12 and only at times when the sawtooth voltage wave amplitudes 224 and 226 approximate the voltages in the X and Y storage circuits 158 and 180, respectively. Each occurs at the relative angular position 232 (FIG. 2) representing the angle 59 of the target 50 (FIGS. 1 and 3) with respect to the radar antenna reference axis 64. Each of the lines 234 in FIG. 2 corresponds to the Y axis 64 in FIG. 3. The Y axis 64 may be considered as pointing north and the starting reference orientation of the scanning antenna 12.

The width 238 of the pulses 230 will be sufficiently greater than the possible variation in width and anticipated arrival time of the echo pulses 228 due to target movement, switching time and voltage approximation errors from target acquisition to tracking.

The wave form 244 (FIG. 2) represents the X coordinate output voltage stored in the X storage circuit 158. The voltage is shown to change at points 246 at the reception of each group of echo pulses represented by 228. This corrective change is caused by the pulses 228 in similar manner to that discussed with reference to the pulses 193 in FIG. 5.

It will be noted that the slopes 248, 250 and 252 between successive stored X coordinate position voltages varies in progressive scans. These slopes are an important feature of the present invention and represent the X coordinate velocity of the selected target 50. Over a number of scans of the antenna 12 these velocity representations will be increased or decreased with each scan until the stored values begin to correspond exactly with the X coordinate velocity of the selected target 50. When this exact correlation is obtained, the X coordinate voltage output in line 166 is varying in exactly the same manner as the X coordinate 60 (FIG. 3) of the selected target 50. Theoretically, it is only during X coordinate accelerations of the target 50 that corrective changes in slopes 248, 250 and 252 occur. At all other times, linear velocity in the X storage circuit 158 insures up-to-date X coordinate information in storage. In practice, minor corrections usually occur on every scan for radar errors, but the invention will continue to track targets over appreciable periods of fading of radar echo pulses. During this fading, the coordinates will continue to vary linearly just as they have been varying during the previous radar scans. The invention thus assumes a straightline flight of the aircraft during the fade, and usually manages to find and gate the echo pulse 193 when it reappears.

Wave form 254 (FIG. 2) represents the Y coordinate output voltage stored in the Y storage circuit 180. The Y coordinate voltage value is shown to change at points 256 at the reception of each group of echo pulses represented by pulse 228 in manner similar to that just described with regard to the X coordinate wave form 244. Also, the Y coordinate slopes 258, 260 and 262 will represent Y coordinate velocities of the selected target 50. Corrective changes are made in manner similar to that just described with respect to the X coordinate wave form 244. This Y coordinate wave form will appear in the output line 186 (FIG. 4) to give continuous Y coordinate information concerning the target 50.

Thus, the combined X and Y coordinate information on the position and movement of the target 45 is continuously available at the ouput lines 166 and 186, respectively (FIG. 4), for suitable indicating devices 263 such as conventional metering devices calibrated to indicate X and Y coordinate target values or target interception indicators.

*Circuit structures*

A suitable circuit for use as the coordinate generator circuit 40 is shown schematically in FIG. 6. Referring to FIG. 6 in more detail, the line 48 carrying a sawtooth range sweep voltage wave 264 is connected through a capacitor 266 to a control grid 268 of an electron tube 270 in a phase inverter circuit 272. The tube 270 has an anode 274 connected through a line 276 to the positive terminal of a power source such as a battery 278, the negative terminal of which is connected to ground. The tube 270 also has a cathode 280 connected through a resistor 282 to the negative terminal of a power source such as a battery 284, the negative terminal of which is grounded. The cathode 280 is also connected through a line 286 to the grid 288 of another electron tube 290 which has anode 292 connected through a resistor 294 to the positive terminal of the battery 278. Cathode 296 is connected through a variable resistor 298 and fixed resistor 300 to the negative terminal of battery 284.

The anode 292 is also connected through a capacitor 302 to a control grid 304 of a further electron tube 306 having an anode 308 connected to the positive terminal of an electric power source as a battery 310, the other terminal of which is connected to ground. The tube 306 has a screen grid 312 tied back to the anode 308.

The cathode 296 of the tube 290 is also connected through a capacitor 314 to the control grid 316 of an electron tube 318 similar to the tube 306 and similarly having an anode 320 connected to the positive terminal of a power source such as a battery 322, the other terminal of which is connected to ground. The tube 318 also has a screen grid 324 tied back to the anode 320.

The control grids 304 and 316 of the tubes 306 and 318 are connected through equal resistors 326 and 328, the junction 330 of which is connected to ground.

Also, the tube 306 has a cathode 332 connected through voltage divider resistors 334 and 336 to a cathode 338 in the electron tube 318. The junction 340 of the resistors 334 and 336 is connected through a resistor 342 to the negative terminal of an electric power source such as a battery 344, the other terminal of which is connected to ground.

The cathode 332 of the electron tube 306 is connected through a capacitor 346 and a line 348 to one terminal 350 of a sine potentiometer 352. Similarly, the cathode 338 of the electron tube 318 is connected through a opposite points 359 and 361 to the terminals 350 and the sine potentiometer 352. The sine potentiometer 352 may be comprised of a circularly disposed resistor 360, such as a toroidally wound resistance wire, connected at opposite points 359 and 361 to the terminals 350 and 358, respectively. Two movable arms or wipers 362 and 364 of electrically conductive material are fixed at a ninety degree angle 366 and mounted to rotate about an axis 368. One end of each of the wipers 362 and 364 makes continuous electrical engagement with the circularly disposed resistor 360. The other end of each of the wipers 362 and 364 makes continuous electrical engagement with a conductive slip ring 370 and 372, respectively. The output line 70 (FIGS. 1 and 7) is in continuous electrical engagement with the slip ring 372. Similarly, the output line 80 is in continuous electrical engagement with the slip ring 370. The wipers 362 and 364 are rotated in synchronism with the scan of the antenna 12 by the mechanical linkage 53.

In operation of the coordinate generator 40, the sawtooth range voltage wave 264, which as previously described is triggered by and in synchronism with each master trigger pulse 46, is fed by input line 48 through the capacitor 266 to the grid 268 of the electron tube 270 in the phase inverter circuit 272, for suitable amplification as the sawtooth voltage wave 374 in line 286 leading to the grid 288. Because of the electrical connection between anode 292 of the phase inverter tube 290 and grid 304 of the electron tube 306, the sawtooth voltage wave 374 will appear at the grid 304 as a saw tooth voltage wave 376 which is 180 degrees out of phase with the waves 374 and 264. On the other hand, the connection between the cathode 296 of the electron tube 290 and control grid 316 of the tube 318 will cause a sawtooth voltage wave 377 having the same phase as the waves 374 and 264 to appear at control grid 316. The amplitude of the sawtooth voltage wave 377 is adjusted by the variable resistor 298 to correspond to that of the wave 376.

Thus, a sawtooth voltage wave 378 which is 180 degrees out of phase with a sawtooth voltage wave 380 will appear in lines 348 and 356, respectively, leading to the respective ends of the sine potentiometer resistor 360. The individual sawteeth of the voltage waves 378 and 380 will be in synchronism with the corresponding master trigger pulse 46 and of equal amplitude. The wipers 362 and 364 are positioned with respect to the orientation of the antenna 12 and rotated by the mechanical linkage 53 in synchronism with the scan of the antenna 12 so that the sine modulated saw tooth voltage wave 56 (FIG. 2) will appear in output line 70 and the cosine modulated sawtooth wave 58 will appear in output line 80 of the coordinate generator 50. This would be effected in the sine potentiometer 352 by orienting the wipers with respect to the antenna 12 in such position that the wiper 364 is at zero potential or grounded point 382 on the potentiometer resistor 360 when the antenna 12 is at the starting reference orientation shown by the Y axis 64 in FIG. 3.

Circuits which are suitable for use as the X and Y differential amplifiers 136 and 140 and the gate generating matrix 148 are shown schematically in FIG. 7. Referring to FIG. 7 in more detail, the X coordinate information feed line 134 (FIGS. 4 and 7) is connected to a control grid 386 of a double envelope high gain electron tube 388 having an anode 390 connected to the output line 144 (FIGS. 4 and 8). The anode 390 is also connected through a resistor 392 to the positive terminal of an electric power source such as a battery 394, the negative terminal of which is connected to ground. Also associated with the grid 386 is a cathode 396 connected through a constant current tube 397 and a resistor 398 to the negative terminal of an electric power source such as a battery 399, the positive terminal of which is connected to ground. The constant current tube 397 has a control grid 400 suitably biased on the battery 399.

The double envelope tube 388 also has another control grid 402 connected to the X storage feedback line 164. The control grid 402 is associated with an anode 404 connected to the output line 146. The anode 404 is also connected through a resistor 406 to the positive terminal of an electric power source such as a battery 408, the negative terminal of which is connected to ground. Also, associated with the control grid 402 is a cathode 410 connected through the constant current tube 397 and resistor 398 to the negative terminal of the battery 399.

In similar manner, the Y coordinate information line 138 (FIGS. 4 and 7) is connected to a control grid 414 of a double envelope high gain electron tube 416. Associated with the control grid 414 is an anode 418 connected to the output line 168. The anode 418 is also connected through a resistor 420 to the positive terminal of an electric power source such as a battery 422, the negative terminal of which is connected to ground. Control grid 414 has also associated therewith a cathode 424 connected through a constant current tube 425 and a resistor 426 to the negative terminal of an electric power source such as a battery 427, the positive terminal of which is connected to ground. The constant current tube 425 has a control grid 428 suitably biased on the battery 427.

The double envelope electron tube 416 has a second control grid 429 connected to the Y storage feedback line 184 for Y coordinate stored information. Associated with the control grid 429 is an anode 430 connected to the output line 170. The anode 430 is also connected through a resistor 431 to the positive terminal of an electric power source such as a battery 432, the negative terminal of which is connected to ground.

The output lines 144, 146, 168 and 170 of the X and Y differential amplifiers 136 and 140 are connected through diodes 434, 436, 438 and 440 respectively, functioning as current polarity-responsive uni-directional conductors in the gate generating matrix 148, to the line 442. The line 442 is connected through a capacitor 443 to a control grid 444 of an electron tube 445 in a pulse clipper and amplifier circuit 446. The circuit has a second amplifier tube 447, the anode of which is connected to the output line 162 leading to the video gate 132.

In the operation of the differential amplifier circuit 136 the modulated sawtooth voltage waves 52 (FIG. 2) representing the X coordinate, as explained above, continuously appear through the information line 134 at the control grid 386 of the tube 388. Also, the X coordinate position voltage 244 (FIG. 2) from the X storage circuit continuously appear through line 164 at the control grid 402 of the tube 388. Thus, the plate voltages in lines 144 and 146 will represent the positive and negative differences between the X voltage values applied at the two grids 386 and 402. When the voltage in the X output lines 144 and 146 are equal and at an intermediate value corresponding to zero volts difference, the voltage at control grid 386 will be the same as the X position voltage at grid 402.

Similarly, the sawtooth voltage waves representing the modulated Y coordinate sawtooth voltages waves 54 (FIG. 2), as explained above, appear continuously through the information line 138 at the control grid 414 of the electron tube 416. Also, the Y coordinate position voltage 254 (FIG. 2) from the Y storage circuit 180 will continuously appear through line 184 at the control grid 429 of the electron tube 416. Thus, the plate voltages in the output lines 168 and 170 will represent the positive and negative difference of the Y voltage values applied at the grids 414 and 429. Similarly, when the plate voltages in the Y output lines 168 and 170 are equal and at an intermediate value, corresponding to zero volts difference, the voltage at control grid 414 will be the same as the position Y voltage at grid 416.

The matrix 148 is so arranged that its output in line 442 will always be about the same as the lowest voltage in the four lines 144, 146, 168 and 170. Therefore, the highest value the matrix output in line 442 can read is the abovementioned intermediate value when the plate voltages in lines 144 and 146 are equal, and the plate voltages in lines 168 and 170 are equal.

The voltage in the X coordinate output line 144 is the inverse value of the voltage in the X coordinate output line 146. Likewise, the voltage in the Y coordinate output line 168 is the inverse value of the voltage in the output line 170. The voltage in the line 146 cannot rise above the intermediate value without the voltage in line 144 going below the intermediate value. This condition exists also with respect to the voltages in lines 168 and 170. Therefore, the peak voltage value occurs in line 442 only when the grid 386 and 402 voltages on the X differential amplifier 136 are about equal and the grid 414 and 429 voltages on the Y differential amplifier 140 are about equal simultaneously in both of the differential amplifiers 136 and 140.

The time at which this double equality of voltages condition occurs is the time at which a gate is desired to be generated. Therefore, this highest output voltage condition in line 442 is clipped and amplified in the pulse clipper and amplifier circuit 446 to produce the gating pulse 190 in line 162. The width 192 (FIGS. 5 and 7) of the gating pulse 190 can be varied by varying the clip level. The gating pulse 190 is preferably made wide enough so that if the gate position is slightly displaced with respect to a pulse 193, the video pulse 193 (FIG. 5) can still pass through the video gate 132 to the X and Y correction circuits 154 and 176, respectively, as explained above.

A circuit suitable for use as the X correction circuit 154 is shown schematically in FIG. 8. Referring to FIG. 8 in more detail, the X output line 144 from the X differential amplifier 136 is connected through line 150, a resistor 448 and line 450 to a control grid 452 of an electron gating tube 454. The electron tube 454 has an anode 456 connected through a resistor 458 to the positive terminal of an electric power source such as a battery 460, the negative terminal of which is connected to ground. The anode 456 is also connected through a capacitor 462 and a line 464 to the X correction circuit output line 156. The electron tube 454 has a cathode 466 connected to a variable resistor 468 having one end connected to ground and the other end connected to the positive terminal of an electric power source such as a battery 470, the negative terminal of which is connected to ground.

In similar manner, the X differential amplifier output line 146 is connected through the line 152, a resistor 472 and a line 474 to a control grid 476 of an electron gating tube 478. The electron tube 478 has an anode 480 connected to the positive terminal of an electric power source, as a battery 482, the negative terminal of which is connected to ground. The electron tube 478 has a cathode 484 connected through a capacitor 486 and the line 464 to the X correction output line 156. The cathode 484 is also connected to a variable resistor 488 having one end connected to ground and the other end to the positive terminal of an electric power source such as a battery 490, the negative terminal of which is connected to ground.

A pair of series capacitors 492 and 494 are connected across the lines 450 and 474 leading to the grids 452 and 476, respectively. The output line 160 from the video gate 132 is connected to a line 496 in series with and between the capacitors 492 and 494.

In the operation of the X correction circuit 154 the potential of the plate 390 (FIG. 7) of the differential amplifier tube 388 will appear through lines 144, 150, resistor 448 and line 450 at the grid 452 of the electron tube 454. The electron tube 388 being a high gain tube, the voltage on plate 390 will have a high rise time when the sawtooth voltage 52 (FIGS. 2 and 5) in line 134 approaches the corresponding storage voltage in line 164 (FIGS. 4 and 7).

The potential at the cathode 466 is set by the variable resistor 468 to a value where the plate 390 voltage appearing at the control grid 452 causes the electron tube 454 acting as a gate to open when the storage voltage in line 164 from the X storage circuit 158 is higher than the sawtooth voltage 52 and to close when the sawtooth voltage 52 is higher than the storage voltage in line 164.

In similar manner, the potential of the other plate 404 of the high gain differential amplifier tube 388 will appear through lines 146, 152, resistor 472, and line 474 at the grid 476 of the other gating tube 478 in the correction circuit 154. It will be noted that the other plate 404 of the high gain tube 388 (FIG. 7) in the X differential amplifier 136 has an opposite wave form from that just described with regard to plate 390. The plate 404 will have a very sharp fall in voltage when the sawtooth voltage 52 (FIGS. 2 and 5) in line 134 approaches the corresponding storage voltage in line 164 (FIGS. 4 and 7). The potential at the cathode 484 of the gating tube 478 (FIG. 9) is adjusted to a value such that the tube 478 acting as a gate is caused to be open when the sawtooth voltage 52 in line 134 is higher than the storage voltage in line 164 and to close when the storage voltage is higher than the sawtooth voltage.

Thus at any given instant either the first mentioned gate tube 454 is open or both tubes 454 and 478 are partially open. If the video or target echo pulse 193 (FIG. 5) is received in line 160 before the rising X sawtooth voltage 52 reaches that of the storage voltage as 200 (FIG. 2), the video or target echo pulse 193 is transmitted through the gate tube 454 and appears as a negative pulse 500 in line 464 (FIG. 8). If the video or target echo pulse 193 is received in line 160 after the rising sawtooth voltage 52 has exceeded the value of the X storage voltage 200, the video pulse 193 is transmitted through the gate tube 478 in the line 464 as a positive pulse 502.

The resulting pulses 500 or 502 in line 464 pass through line 156 to correct the storage voltage in the X storage circuit 158. The negative pulse 500 will lower the storage voltage and the pulse 502 will raise the storage voltage, as will be hereinafter further described.

The Y correction circuit 176 (FIG. 4) may be the same as the X correction circuit 154 in both construction and operation. In the case of the Y correction circuit 176, the lines 150, 152, 160 and 156 (FIG. 8) would be replaced by lines 172, 174, 178 and 182, respectively.

A circuit suitable for use as the X storage circuit 158 is illustrated schematically in FIG. 9. Referring to FIG. 9 in more detail, the output line 156 from the correction circuit 154 (FIGS. 4 and 8) is connected through a pair of parallel connected storage condensers 504 and 506, a relay switch arm 508, and a line 510 to a control grid 512 is an electron tube 514. The relay switch arm 508 is normally held in open circuit in the line 510 by a spring 516 fixed at one end to the relay switch arm 508 and at its other end to a rigid support 518.

The electron tube 514 has an anode 520 connected to the positive terminal of an electric power source such as a battery 522 which has its negative terminal connected to ground. The electron tube 514 also has a cathode 524 connected through a resistor 526 to the negative terminal of an electric power source such as a battery 528, the positive terminal of which is connected to ground. The cathode 524 is also connected to a line 530 having one end connected through a resistor 532 to a line 534 between a pair of storage capacitors 536 and 538 connected in series between the line 510 leading to the control grid 512 and ground 536. The other end of the line 530 is led to a control grid 538 of a cathode follower electron tube 540. The electron tube 540 has an anode 542 connected to the positive terminal of an electric power source as a battery 543, the negative terminal of which is connected to ground. The electron tube 540 also has a cathode 544 connected through a resistor 546 to the negative terminal of an electric power source as a battery 548, the positive terminal of which is connected to ground. The cathode 544 is also connected to the output line 166 and feedback line 164 (FIGS. 4 and 9).

The switch arm 508 is in operative relation to a magnetic cored solenoid 548 having one end connected to the positive terminal of an electric power source as a battery 550, the negative terminal of which is connected to ground. The other end of the solenoid 548 is connected to an anode 552 of an electron relay tube 554 having a cathode 553 connected to ground. The electron tube 554 also has a control grid 555 connected through a capacitor 556 to the line 161 (FIGS. 4 and 9).

The voltages on the condensers 504 and 506 will be increased or decreased depending on whether the correction pulses in line 156 are positive as pulse 502 or negative as 500 (FIG. 8). The video pulses 193 (FIG. 5), which initiate the voltage correction pulses 500 and 502, also appear through the line 161 and capacitor 556 at the control grid of the tube 554, thereby energizing its solenoid 548 to cause the switch arm 508 to close the circuit in line 510. Due to mechanical inertia of the switch arm 508, the circuit in line 510 may not be completely closed until the next sawtooth voltage wave 52 (FIG. 5). Nevertheless, correction pulses as 500 and 502 are stored in the capacitors 504 and 506. When the switch arm 508 closes the circuit in the line 510, the stored voltages on capacitors 504 and 506 will effect a corresponding change on the X storage capacitors 536 and 538. The total voltage across the X storage capacitors 536 and 538 represents the X coordinate voltage. It will be noted here that this total voltage representing the X coordinate is continually undergoing corrective incremental changes to correspond with target position changes. It continuously represents the X coordinate 60 (FIG. 3) and appears at the control grid 512 to effect a comparable voltage through line 530 at the control grid 538 of the cathode followers 540 and thereby in the output line 166.

It should be noted here that this X coordinate position voltage across the capacitors 536 and 538 is continuously maintained correct or nearly correct even though the increments from the correction pulses 500 and 502 (FIG. 8) may be intermittent or extremely irregular. Also, by using the principle of making periodic corrections to the stored coordinate voltage in the capacitors 536 and 538, the structure lends itself to very accurate continuous data on target 50 position and movement.

The voltage across the capacitor 536 represents the X coordinate velocity voltage. The bootstrap circuit arrangement causes the velocity voltage across the capacitor 536 to be integrated continuously into the output voltage by current flow through the resistor 532.

When the gain of the cathode follower 540 is unity the current $i$ through the resistor 532 will be proportional to the velocity voltage across the capacitor 536.

The voltage across the capacitor 538 can be expressed mathematically as:

$$V_{538} = k_1 \int i\, dt + k_2 \qquad (1)$$

and since $i$ is proportional to the velocity $$V_{538} = \int v\, dt + X_0 \qquad (2)$$

where:

$X_0$ represents the previous X target coordinate
$V_{538}$ is the voltage across capacitor 538
$k_1$ is a proportionality constant
$k_2$ is a starting value proportionality constant
$i$ is the current through the resistor 532
$v$ is the velocity The Y coordinate storage circuit 180 may be identical in construction and operation to the X storage circuit just described and illustrated in FIG. 9. For the Y coordinate storage circuit 180, the lines 156, 128, 164, 166 and 161 would be replaced by lines 182, 142, 184, 186 and 181, respectively.

Circuits which are suitable for use as the acquisition voltage generator 86 are illustrated schematically in FIG. 10. Referring to FIG. 10 in more detail, the X coordinate acquisition voltage line 88 (FIG. 1) is connected through a movable arm 558 to a potentiometer resistor 560. The resistor 560 has careful calibrations 561 along its length corresponding to the vertical grating lines 188 (FIG. 1) on the indicator 30. One end of the resistor 560 is connected to the negative terminal of a power source as a battery 562, the positive terminal of which is connected to ground. The other end of the resistor 560 is connected to the positive terminal of a power source as a battery 564, the negative terminal of which is grounded. The batteries 562 and 564 and resistor 560 are so selected that at each calibration 561 a voltage will appear in line 88 corresponding to the X coordinate position voltage of a selected target 50 as represented by the vertical grating line 188 at which a blip 51 of the selected target 50 appears. The X coordinate voltages available on the resistor 560 will be the entire range of X coordinate position voltages represented on the screen 30. The setting of the arm 558 may be manually made to the calibration line 561 corresponding to the vertical grating line 188 visually found as the one on which the blip 51 of the selected target 50 appears. Thus the corresponding X acquisition voltage will appear through line 88 at the X storage circuit 158 (FIGS. 4 and 10).

Similarly, the Y coordinate acquisition voltage line 96 is connected through a movable arm 566 to a potentiometer resistor 568. The resistor 568 has carefully spaced calibrations 570 corresponding to the horizontally disposed grating lines 187 (FIG. 1) on the indicator 30. The resistor 568 is connected across batteries 572 and 574 in similar manner to the resistor 560. The resistor 570 and batteries 572 and 574 are so selected that Y coordinate position potentials may be obtained covering the entire Y coordinate range of a selected target 50 as represented by a blip 51 on the indicator 30. Thus the Y coordinate position potentials may be obtained covering the entire Y coordinate range of a selected target 50 as represented by a blip 51 on the indicator 30. Thus the Y coordinate position of a selected target seen on the screen 30 may be manually set by the arm 566 and calibrations 570 to cause a corresponding acquisition Y coordinate position voltage to appear through line 96 at the Y storage circuit 180.

An alternative acquisition voltage generator 86 suitable for use in the present embodiment is comprised of a voltage pickup manually applicable with a resistive surface voltage divider structure 188 and 189 for producing acquisition voltages proportional to target position.

A circuit suitable for use as the video gate 132 is shown schematically in FIG. 11. Referring to FIG. 11 in more detail, line 162 from the gate generating matrix is connected through a capacitor 578 to a control grid 580 of an electron gating tube 582. The gating tube 582 has an anode 584 connected through a resistor 586 to the positive terminal of a power source such as a battery 588, the negative terminal of which is connected to ground. A screen grid 590 in the gating tube 582 is tied back to the positive terminal of the battery 588. A third or video grid 592 of the gating tube 582 is connected through a capacitor 594 to the video information line 130 (FIGS. 4 and 11). Also, the video grid 592 is connected through a grid bias resistor 596 to a negative biasing power source such as the negative terminal of a battery 598, the positive terminal of which is connected to ground. Similarly, the grid 580 is connected through a bias resistor 600 to a negative biasing power source as the negative terminal of a battery 602, the positive terminal of which is connected to ground. A cathode 604 in the gating tube 582 is connected to ground.

The anode 584 of the gating tube 582 is also connected through a capacitor 606 to the control grid 608 of an amplifier and pulse inverter electron tube 610. The grid 608 is also connected through a resistor 612 to ground. The tube 610 has a cathode 614 connected to ground and an anode 616 connected through a resistor 618 to the positive terminal of a power source as a battery, the negative terminal of which is connected to ground. The anode 616 is also connected to the lines 160 and 178 leading to the X and Y correction circuits, respectively.

In the operation of the video gate 132 the negative bias on the grids 580 and 592 will make the gating tube 582 nonconductive except at the occurrence of echo pulses 55 during the time of the gating pulse 190. Such simultaneous occurrence of pulses 190 and 55 will cause a negative pulse 622 to appear from the anode 584, through the capacitor 606 and at the control grid 608 to thereby cause a positive pulse 193 to appear at the anode 616 and the lines 160 and 178.

This invention is not limited to the specific details described as equivalents will suggest themselves to those skilled in the art.

What is claimed is:

1. In a radar tracking system of the type having a scanning antenna, a transmitting and receiving system for transmitting pulses of radio energy and receiving corresponding reflected pulses from distant targets, a radar screen and a sawtooth voltage signal generator for projecting said reflected pulses in polar positions on said screen; means coupled to said generator for transforming the sawtooth voltage signal from said generator into a pair of sawtooth voltage signals, one modulated as the sine and the other the cosine of the orientation of said scanning antenna; capacitor means for storing a pair of voltages, each representing a Cartesian coordinate of the position of said target with respect to said scanning antenna; a voltage differential amplifier circuit for each of said Cartesian coordinates, each voltage differential amplifier circuit being coupled to the corresponding coordinate storing means and modulated sawtooth signal means for continuously comparing the coordinate stored voltage with the modulated voltage signals; a voltage correction circuit for each of the coordinates coupled to the corresponding coordinate capacitor storing means and differential amplifier; a gating circuit coupled to each of said correction circuits and receiver for controlling the passage of said reflected pulses to each of the correction circuits; a gate generating means coupled to each of the differential amplifier circuits and said gating circuit for allowing said reflected pulses to pass said gating circuit during the period of substantial voltage equality between each compared modulated voltage and the voltage at the corresponding coordinate capacitor storage means; and means in each of said correction circuits responsive to each of said gated pulses for causing an incremental voltage correction in the corresponding coordinate voltage storage means.

2. An apparatus as in claim 1 wherein each of said capacitor storage means includes two capacitor storage circuits and means for making circuit therebetween, one of said capacitor circuits and said circuit making means being in responsive relation to said gated pulses whereby said incremental voltage change occurs in said one circuit for each of the gated pulses and an incremental voltage correction occurs in the other of said capacitor circuits upon the making of said circuit therebetween.

3. An apparatus as in claim 1 wherein each of said differential amplifiers includes a pair of electron tubes having a control grid and anode, the modulated voltage signal means of the corresponding coordinate being coupled to one of said control grids, the corresponding coordinate capacitor storage means being coupled to the other control grid, a common coupling for each of the anodes and said gating circuit, and unidirectional current means for each of the anodes making circuit between the respective anode and said common coupling.

4. An apparatus as in claim 1 wherein the correction circuit includes a pair of electron tubes having a cathode, anode and control grid, the anode of one and the cathode of the other of said current valves being coupled to the corresponding coordinate capacitor storing means, each differential amplifier and gating circuit coupled to the grids of said pair of electron tubes in the corresponding correction circuit for providing said means in each of the correction circuits for causing said incremental voltage change in the corresponding voltage storage means.

5. An apparatus as in claim 1 wherein each of said capacitor storage means includes two capacitor storage circuits and means for making circuit therebetween, a pair of electron tubes having a cathode, anode and control grid in each of said correction circuits, the anode of one and the cathode of the other of said electron tubes being coupled to one of the capacitor storage circuits in the corresponding coordinate capacitor storing means, each differential amplifier and gating circuit coupled to the grids of said pair of electron tubes in the corresponding correction circuit for causing incremental voltage corrections in said one capacitor storage circuit for each of the gated pulses and an incremental voltage correction in the other of said capacitor circuits upon the making of said circuit therebetween.

References Cited in the file of this patent

UNITED STATES PATENTS

| | | |
|---|---|---|
| 2,422,334 | Bedford | June 17, 1947 |
| 2,677,758 | Robinson et al. | May 4, 1954 |
| 2,688,743 | Berger et al. | Sept. 7, 1954 |
| 2,709,804 | Chance et al. | May 31, 1955 |
| 2,849,707 | White | Aug. 26, 1958 |
| 2,866,966 | White | Dec. 30, 1958 |
| 2,924,818 | White | Feb. 9, 1960 |